(12) United States Patent
Sato

(10) Patent No.: US 8,712,232 B1
(45) Date of Patent: Apr. 29, 2014

(54) REAL-IMAGE ZOOM VIEWFINDER AND IMAGING APPARATUS

(71) Applicant: FUJIFILM Corporation, Tokyo (JP)

(72) Inventor: Kenichi Sato, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/146,019

(22) Filed: Jan. 2, 2014

Related U.S. Application Data

(63) Continuation of application No. PCT/JP2012/003916, filed on Jun. 15, 2012.

(30) Foreign Application Priority Data

Jul. 4, 2011 (JP) ................. 2011-147866

(51) Int. Cl.
*G03B 13/10* (2006.01)
*G02B 23/14* (2006.01)

(52) U.S. Cl.
USPC .......................................... 396/379; 359/432

(58) Field of Classification Search
USPC .......................................................... 396/379
See application file for complete search history.

(56) References Cited

U.S. PATENT DOCUMENTS

| | | | |
|---|---|---|---|
| 5,471,271 A | 11/1995 | Kamo | |
| 5,570,229 A | 10/1996 | Kanamori | |
| 5,757,543 A | 5/1998 | Ogata | |
| 6,038,069 A | 3/2000 | Yamaguchi | |
| 6,859,332 B2 * | 2/2005 | Nagata et al. | 359/676 |
| 6,961,187 B2 * | 11/2005 | Amanai | 359/666 |
| 6,973,266 B2 * | 12/2005 | Tochigi | 396/379 |
| 7,079,325 B2 * | 7/2006 | Konno | 359/682 |
| 7,227,706 B2 * | 6/2007 | Yagyu et al. | 359/737 |
| 8,218,959 B2 * | 7/2012 | Seo | 396/72 |
| 2003/0117719 A1 * | 6/2003 | Wakai et al. | 359/726 |
| 2003/0179464 A1 * | 9/2003 | Amanai | 359/685 |
| 2004/0066561 A1 * | 4/2004 | Nagata et al. | 359/676 |
| 2004/0201901 A1 * | 10/2004 | Nagata | 359/676 |
| 2004/0246362 A1 * | 12/2004 | Konno | 348/335 |
| 2006/0215277 A1 * | 9/2006 | Sato | 359/687 |

(Continued)

FOREIGN PATENT DOCUMENTS

| | | |
|---|---|---|
| JP | 04-171410 | 6/1992 |
| JP | 06-75165 | 3/1994 |

(Continued)

OTHER PUBLICATIONS

International Search Report PCT/JP2012/003916 dated Oct. 16, 2012, with English Translation.

*Primary Examiner* — Rodney Fuller
(74) *Attorney, Agent, or Firm* — Young & Thompson

(57) ABSTRACT

A zoom viewfinder substantially consists of, in order from the object side: a variable-magnification objective lens system substantially consisting of a first lens group that includes a negative first-group first lens and a reflective member arranged in this order from the object side, a positive second lens group that is moved during magnification change, and a positive third lens group that is moved during magnification change; an erect optical system having a reflective surface for converting an inverted image into an erect image; and a positive eyepiece lens system, wherein conditional expressions (1), (2A) and (3) below are satisfied:

$$1.5 < U2/U1 < 3.0 \quad (1),$$

$$1.76 \leq |f2/f| < 2.0 \quad (2A) \text{ and}$$

$$1.0 < f3/f2 < 5.0 \quad (3).$$

4 Claims, 17 Drawing Sheets

(56) References Cited

U.S. PATENT DOCUMENTS

| | | | |
|---|---|---|---|
| 2008/0088942 A1* | 4/2008 | Seo | 359/672 |
| 2009/0207502 A1* | 8/2009 | Cho | 359/689 |
| 2009/0268307 A1* | 10/2009 | Sato | 359/687 |
| 2010/0026878 A1* | 2/2010 | Seo | 348/345 |
| 2010/0066894 A1* | 3/2010 | Seo | 348/340 |
| 2011/0044673 A1* | 2/2011 | Kawamura et al. | 396/72 |

FOREIGN PATENT DOCUMENTS

| | | |
|---|---|---|
| JP | 07-5360 | 1/1995 |
| JP | 08-190130 | 7/1996 |
| JP | 08-234103 | 9/1996 |
| JP | 11-72706 | 3/1999 |
| JP | 2000-347101 | 12/2000 |
| JP | 2003-131292 | 5/2003 |

* cited by examiner

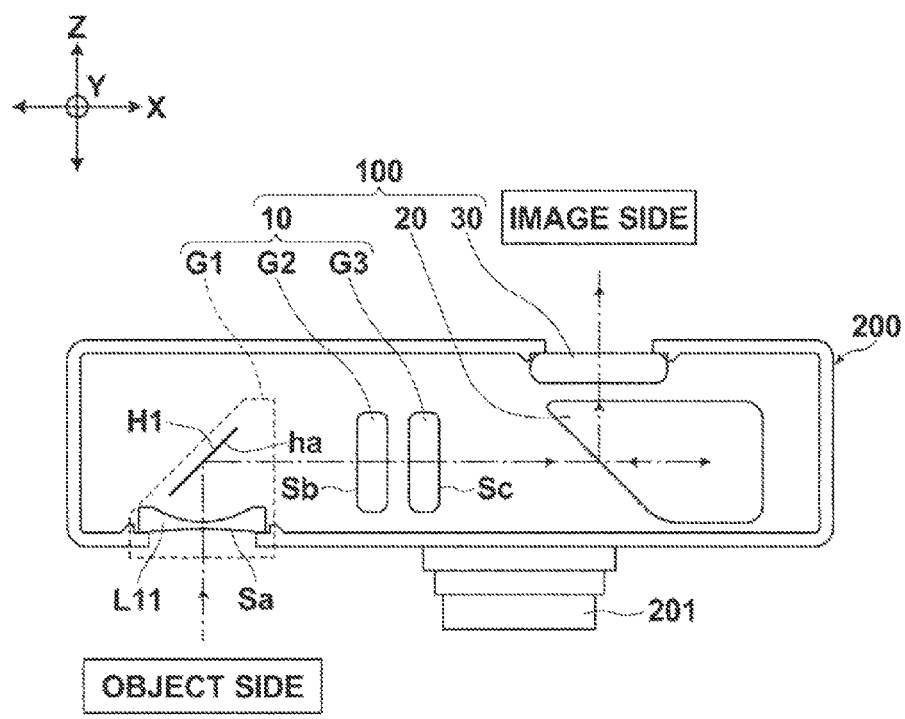
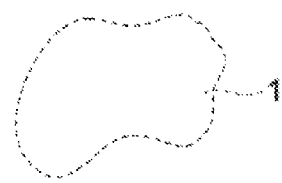
FIG.1

EXAMPLE 1

FIG.7
EXAMPLE 2
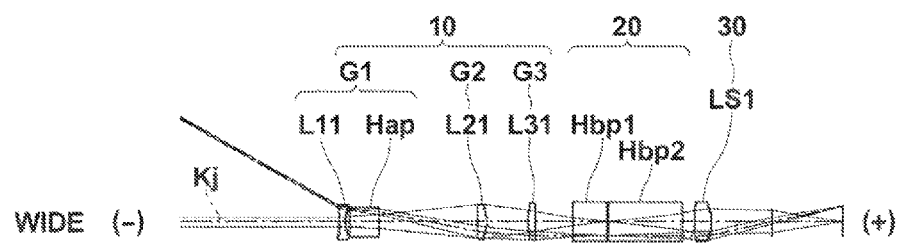
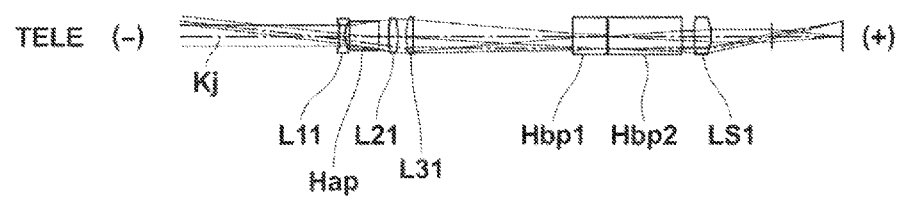

FIG.8
EXAMPLE 3
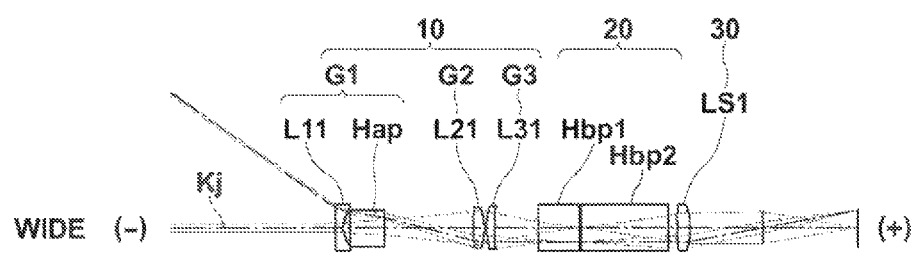
WIDE
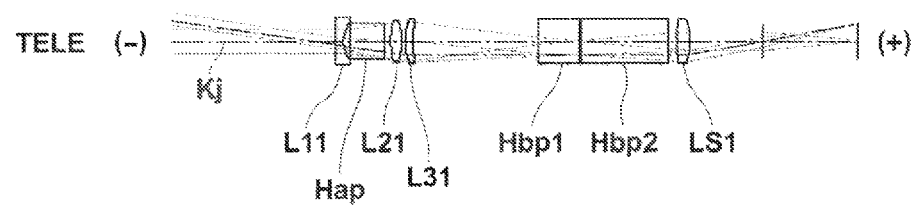
TELE

FIG.9
EXAMPLE 4
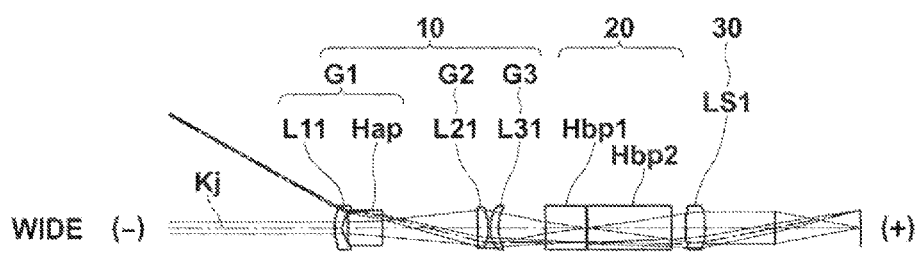
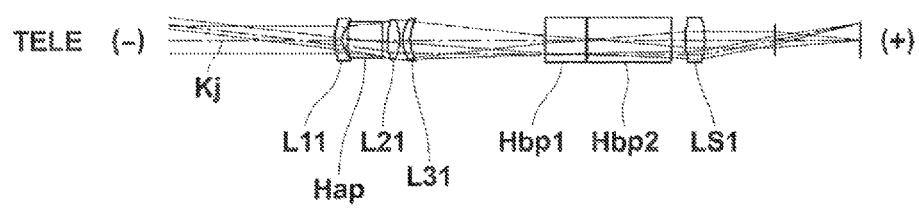

FIG.10
EXAMPLE 5
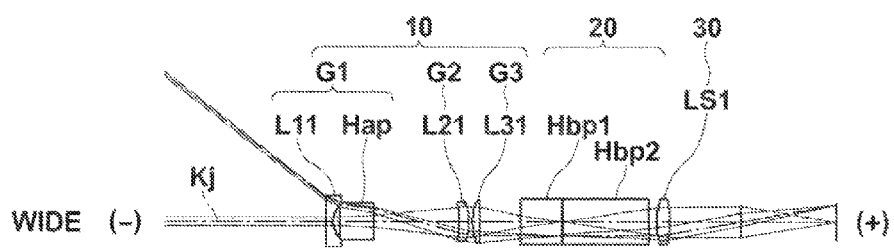
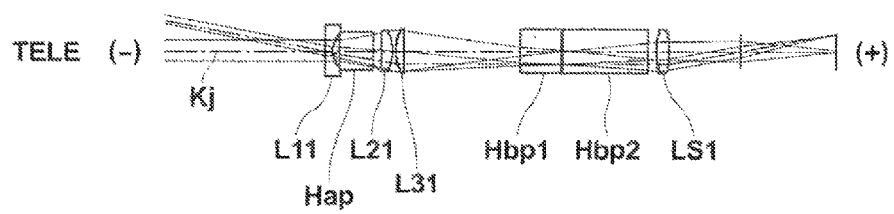

FIG.11
EXAMPLE 6
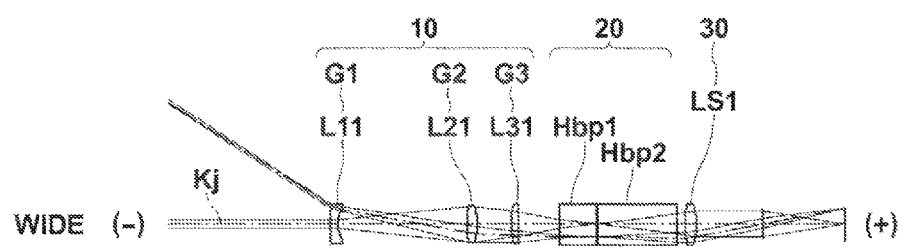
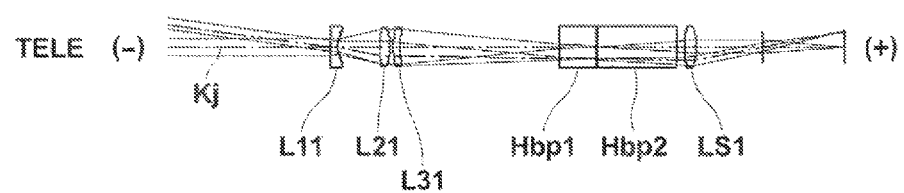

FIG.17
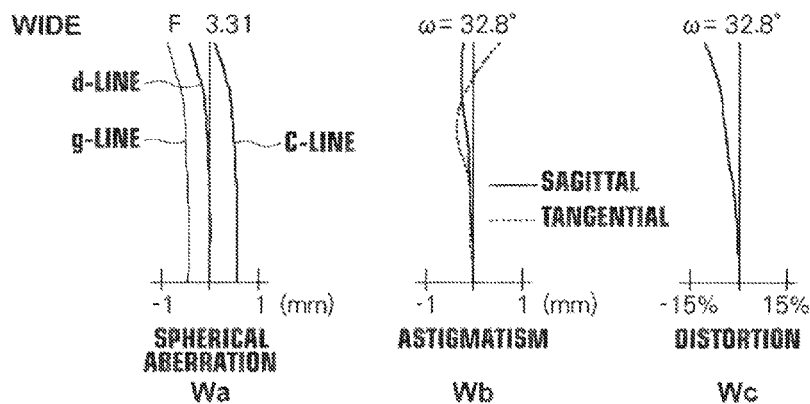
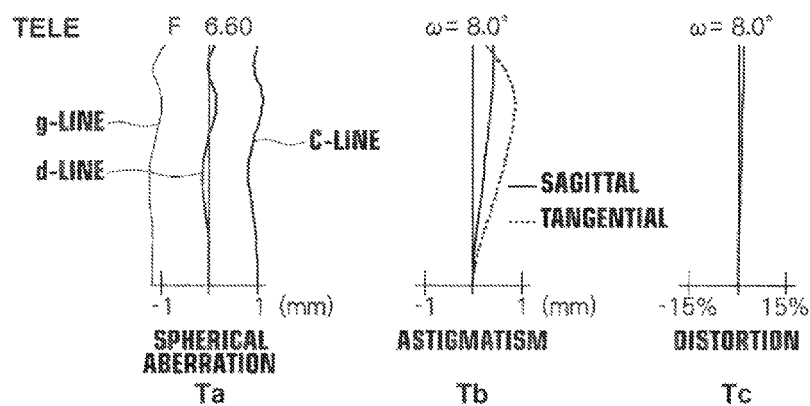

REAL-IMAGE ZOOM VIEWFINDER AND IMAGING APPARATUS

TECHNICAL FIELD

The present invention relates to a real-image zoom viewfinder and an imaging apparatus which can provide a good viewfinder image by appropriately setting a variable-magnification objective lens system, an erect optical system and an eyepiece lens system.

BACKGROUND ART

Conventionally, real-image zoom viewfinders that are configured to form a vertically and horizontally inverted real image using an objective lens having a positive refractive power, convert the real image into an erect image using an erecting prism that is formed by a combination of one or more prisms, and enlarge the erect image using an eyepiece lens having a positive refractive power are known. Further, imaging apparatuses equipped with such a real-image zoom viewfinder are also known.

As an example of an objective lens forming such a real-image zoom viewfinder, one substantially includes, in order from the object side, a first lens group having a negative refractive power, a second lens group having a positive refractive power, a third lens group having a negative refractive power and a fourth lens group having a positive refractive power, wherein a prism having a convex lens surface facing the object side is employed as the fourth lens group, is known (see Japanese Unexamined Patent Publication No. 8 (1996)-190130 (hereinafter, Patent Document 1).

As another example of the objective lens forming such a real-image zoom viewfinder, one includes, in order from the object side, a first lens group having a positive refractive power, a second lens group having a negative refractive power, a third lens group having a positive refractive power and a fourth lens group having a negative refractive power, wherein a prism having a convex lens surface facing the object side and a convex lens surface facing the image side is employed as the third lens group, is known (see Japanese Unexamined Patent Publication No. 2003-131292 (hereinafter, Patent Document 2).

DISCLOSURE OF INVENTION

There are demands for achieving thickness reduction of a real-image zoom viewfinder of the above-described type while ensuring a zoom ratio of around 4:1. The direction in which the thickness reduction is demanded is the imaging direction, which is the thickness direction of a camera.

The real-image viewfinder disclosed in Patent Document 1, however, has a problem that the thickness reduction while ensuring a zoom ratio of around 4:1 is difficult to be achieved since the length in the thickness direction of a camera is a sum of thicknesses of the objective lens, the prism and the eyepiece lens.

The real-image viewfinder disclosed in Patent Document 2 attempts to achieve the thickness reduction by reducing the thickness in the imaging direction by forming the third lens group by a prism to bend the optical path, and making the second lens group and the fourth lens group, which are disposed in front of and behind the third lens group, be movable groups. However, it is still difficult to achieve sufficient thickness reduction since a significant thickness is required to dispose two lens groups including the first lens group and the second lens group, which are disposed on the object side of the third lens group for bending the optical path and are arranged in the imaging direction.

In view of the above-described circumstances, the present invention is directed to providing a real-image zoom viewfinder that can achieve thickness reduction in the imaging direction without degrading the optical performance, and an imaging apparatus employing the real-image zoom viewfinder.

The real-image zoom viewfinder of the invention is a real-image zoom viewfinder substantially consisting of, in order from an object side, a variable-magnification objective lens system having a positive refractive power, an erect optical system, and an eyepiece lens system having a positive refractive power, wherein the variable-magnification objective lens system substantially consisting of, in order from the object side, a first lens group that includes a first lens having a negative refractive power and a reflective member arranged in this order from the object side and is fixed during magnification change, a second lens group that has a positive refractive power and is moved during magnification change, and a third lens group that has a positive refractive power and is moved during magnification change, the erect optical system has at least one reflective surface for converting an inverted image formed by the variable-magnification objective lens system into an erect image and is fixed during magnification change, the eyepiece lens system has a positive refractive power and is fixed during magnification change, and conditional expression (1) below is satisfied:

$$1.5 < U2/U1 < 3.0 \tag{1}$$

In the conditional expression (1), U1 is a distance from an object-side lens surface of the first lens to a most object-side lens surface in the second lens group along an optical axis in a state where zoom setting is set at a telephoto end.

In the conditional expression (1), U2 is a difference between the distance from the object-side lens surface of the first lens to the most object-side lens surface in the second lens group along the optical axis in a state where the zoom setting is set at the telephoto end and a distance from the object-side lens surface of the first lens to a most image-side lens surface in the third lens group along the optical axis in a state where the zoom setting is set at a wide-angle end.

It is desirable that the real-image zoom viewfinder satisfies conditional expression (2) below:

$$1.5 < |f2/f1| < 2.0.$$

In the conditional expression (2), f1 is a focal length of the first lens group, and f2 is a focal length of the second lens group.

It is desirable that the above-described real-image zoom viewfinder satisfies conditional expression (3) below:

$$1.0 < f3/f2 < 5.0.$$

In the conditional expression (3), f3 is a focal length of the third lens group.

The reflective member in the first lens group may bend an optical path of light entering through the first lens into a direction orthogonal to an optical axis of the first lens, the second lens group and the third lens group may be disposed in the optical path of the light that is bent and propagates in the direction orthogonal to the optical axis, and the erect optical system may bend the optical path of the light that propagates in the direction orthogonal to the optical axis through the variable-magnification objective lens system into the optical axis direction of the first lens.

An imaging apparatus of the invention includes the above-described real-image zoom viewfinder.

It should be noted that the above-described real-image zoom viewfinder may include, besides the above-described three optical systems (namely, the variable-magnification objective lens system, the erect optical system, and the eyepiece lens system): lenses substantially without any refractive power; optical elements other than lenses, such as stops and glass covers; and mechanical components, such as lens flanges, lens barrels, and camera shake correcting mechanisms.

In a case where the above-described real-image zoom viewfinder includes an aspherical lens, the sign, positive or negative, of the refractive power of the aspherical lens is defined by whether the refractive power of the aspherical lens in the paraxial region is positive or negative.

According to the real-image zoom viewfinder and the imaging apparatus of the invention, the real-image zoom viewfinder substantially consists of, in order from the object side, a variable-magnification objective lens system having a positive refractive power, an erect optical system, and an eyepiece lens system having a positive refractive power, wherein the variable-magnification objective lens system substantially consists of, in order from the object side, a first lens group that includes a first lens having a negative refractive power and a reflective member arranged in this order from the object side and is fixed during magnification change, a second lens group that has a positive refractive power and is moved during magnification change, and a third lens group that has a positive refractive power and is moved during magnification change, the erect optical system has at least one reflective surface for converting an inverted image formed by the variable-magnification objective lens system into an erect image and is fixed during magnification change, the eyepiece lens system has a positive refractive power and is fixed during magnification change, and conditional expression (1) below is satisfied:

$$1.5 < U2/U1 < 3.0 \qquad (1).$$

Therefore, the thickness reduction in the imaging direction can be achieved without degrading the optical performance.

In other words, the above-described configuration allows bending an optical path of light from a position where the light is reflected by the reflective member to a position where the light is reflected by the reflective surface of the erect optical system into a direction orthogonal to the imaging direction so as to provide a longer optical path length in the direction orthogonal to the imaging direction and a shorter optical path length in the imaging direction, thereby allowing reducing the optical path length in the imaging direction without reducing the entire optical path length of the light traveling through the real-image zoom viewfinder. In this manner, the thickness reduction of the real-image zoom viewfinder in the imaging direction is achieved without degrading the optical performance for example, with ensuring a zoom ratio of around 4:1).

Further, since the first lens that is disposed on the object side of the reflective member and the eyepiece lens system that is disposed on the image side of the erect optical system are optical systems corresponding to the thickness of the real-image zoom viewfinder and these optical systems are fixed during magnification change, the thickness reduction of the real-image zoom viewfinder in the imaging direction can be achieved with higher certainty.

It should be noted that, if the real-image zoom viewfinder is configured such that the lower limit of the conditional expression (1) is not reached, a distance over which each of the second lens group G2 and the third lens group G3 is moved during magnification change becomes short, and this makes it difficult to achieve correction of aberrations, such as image plane curve. On the other hand, if the real-image zoom viewfinder is configured such that the upper limit of the conditional expression (1) is exceeded, the dimension in the direction orthogonal to the imaging direction has to be increased, and it is difficult to achieve a compact configuration of the real-image zoom viewfinder. Also, the size of the imaging apparatus provided with the real-image zoom viewfinder in the direction orthogonal to the imaging direction has to be increased, and it is difficult to achieve a compact configuration of the imaging apparatus.

BRIEF DESCRIPTION OF THE DRAWINGS

FIG. 1 is a sectional view illustrating the schematic configuration of a real-image zoom viewfinder of the present invention and an imaging apparatus provided with the real-image zoom viewfinder, FIG. 7 is a diagram illustrating a developed view of the configuration and the optical path of a real-image zoom viewfinder of Example 2, FIG. 8 is a diagram illustrating a developed view of the configuration and the optical path of a real-image zoom viewfinder of Example 3, FIG. 9 is a diagram illustrating a developed view of the configuration and the optical path of a real-image zoom viewfinder of Example 4, FIG. 10 is a diagram illustrating a developed view of the configuration and the optical path of a real-image zoom viewfinder of Example 5, FIG. 11 is a diagram illustrating a developed view of the configuration and the optical path of a real-image zoom viewfinder of Example 6, FIG. 17 is a diagram showing aberrations of the real-image zoom viewfinder of Example 6.

DESCRIPTION OF PREFERRED EMBODIMENTS

Hereinafter, a real-image zoom viewfinder of the present invention and an imaging apparatus provided with the real-image zoom viewfinder will be described with reference to the drawings.

Figure 2:
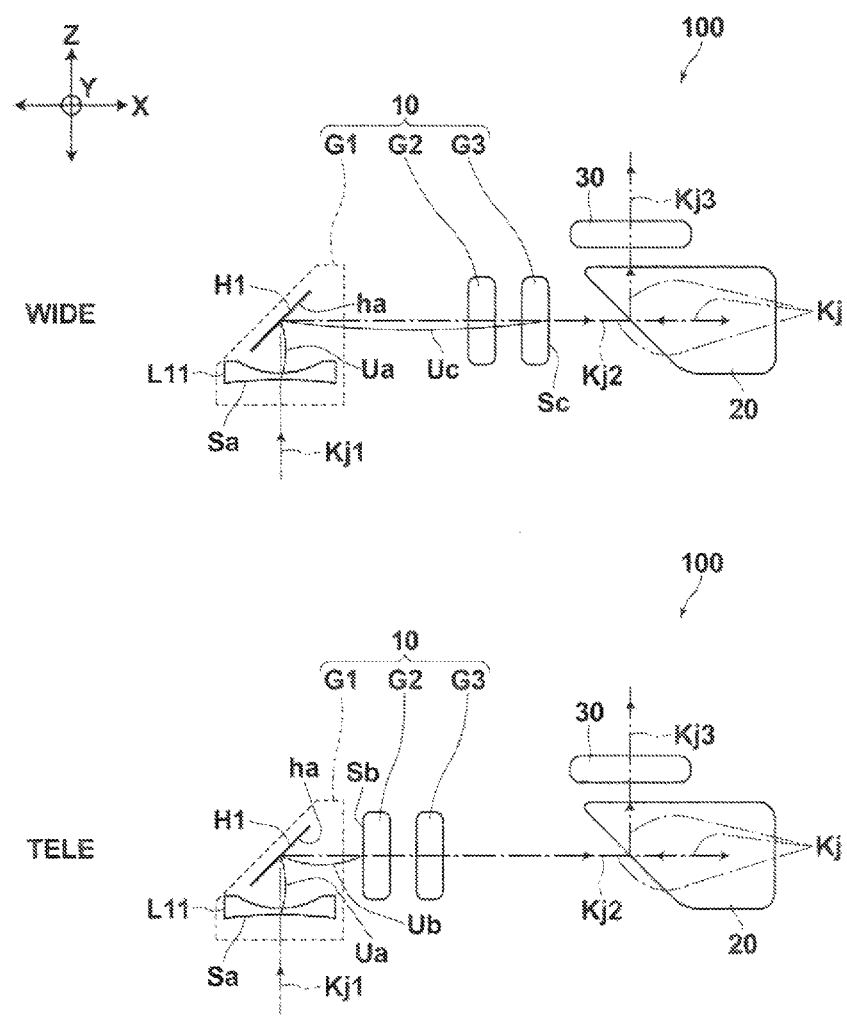
FIG. 2 is a sectional view showing a cross section of the real-image zoom viewfinder when the zoom setting is set at the wide-angle end and a cross section of the real-image zoom viewfinder when the zoom setting is set at the telephoto end in comparison with each other.

FIG. 1 is a sectional view illustrating the schematic configuration of the real-image zoom viewfinder of the invention and the imaging apparatus provided with the real-image zoom viewfinder. FIG. 2 is a sectional view showing a cross section of the real-image zoom viewfinder when the zoom setting is set at the wide-angle end and a cross section of the real-image zoom viewfinder when the zoom setting is set at the telephoto end in comparison with each other. The state where the zoom setting is set at the wide-angle end is shown at the upper portion of FIG. 2 (indicated by the text "WIDE"), and the state where the zoom setting is set at the telephoto end is shown at the lower portion of FIG. 2 (indicated by the text "TELE").

The real-image zoom viewfinder 100 shown includes a variable-magnification objective lens system 10 having a positive refractive power, an erect optical system 20, and an eyepiece lens system 30 having a positive refractive power, which are disposed in this order from the object side.

The variable-magnification objective lens system 10 having a positive refractive power includes, in order from the object side: a first lens group G1 that includes a first lens (a first-group first lens L11) having a negative refractive power and a reflective member H1, which are arranged in this order from the object side; a second lens group G2 having a positive refractive power; and a third lens group G3 having a positive refractive power. The first lens group G1 is fixed during magnification change. The second lens group G2 and the third lens group G3 are moved during magnification change.

It should be noted that the reflective member H1 may be a reflecting mirror or a prism. The reflective member H1 may have a refractive power or may not have a refractive power.

The erect optical system 20 has at least one reflective surface for converting an inverted image formed by the variable-magnification objective lens system 10 into an erect image, and is fixed during magnification change.

The erect optical system 20 may be formed by one optical member or a combination of a plurality of optical members. The erect optical system 20 may have a refractive power or may not have a refractive power.

The eyepiece lens system 30 has a positive refractive power and is fixed during magnification change.

In the real-image zoom viewfinder 100, the reflective member H1 bends the optical path of light entering through the first-group first lens L11, which is in the optical axis direction of the first-group first lens L11 (i.e., the imaging direction, which is the direction of arrow Z in the drawing), into a direction orthogonal to the imaging direction (which is the direction of arrow X in the drawing), and the second lens group G2 and the third lens group G3 are disposed in the optical path of the light that is bent and propagates in the direction orthogonal to the imaging direction. Further, the optical path of the light entering through the variable-magnification objective lens system 10 and propagating in the direction orthogonal to the imaging direction is bent again into the imaging direction by the reflective surface of the erect optical system 20, and the eyepiece lens system 30 is disposed in the optical path of the light that is bent and propagates in the imaging direction.

An optical axis portion Kj1 that extends in the imaging direction and corresponds to the optical axis of the first-group first lens L11 and an optical axis portion Kj2 that extends in the direction orthogonal to the imaging direction and corresponds to the optical axis of the second lens group and the third lens group are orthogonal to each other. The optical axis Kj1 of the first-group first lens L11 and an optical axis portion Kj3 that extends in the imaging direction and corresponds to the optical axis of the eyepiece lens system 30 are parallel to each other.

The above-described real-image zoom viewfinder 100 satisfies conditional expression (1) below:

$$1.5 < U2/U1 < 3.0.$$

In the conditional expression (1), U1 is a distance from an object-side lens surface Sa of the first-group first lens L11 to a most object-side lens surface Sb in the second lens group G2 along the entire optical axis Kj that is the bent optical axis through the entire real-image zoom viewfinder 100 (a distance along the optical path) in the state where the zoom setting is set at the telephoto end.

U2 is a difference between the distance from the object-side lens surface Sa of the first-group first lens L11 to the most object-side lens surface Sb in the second lens group G2 along the entire optical axis Kj in the state where the zoom setting is set at the telephoto end and a distance from the object-side lens surface Sa of the first-group first lens L11 to a most image-side lens surface Sc in the third lens group G3 along the entire optical axis Kj in the state where the zoom setting is set at the wide-angle end.

As shown in FIG. 2, the distance value U1 can be calculated as a sum of "a distance value Ua along the optical axis from the object-side lens surface Sa of the first-group first lens L11 to a reflective surface ha of the reflective member H1" and "a distance value Ub along the optical axis from the reflective surface ha to the most object-side lens surface Sb in the second lens group G2" in the state where the zoom setting is set at the telephoto end.

That is, the value U1 can be calculated by the equation below:

$$U1 = Ua + Ub.$$

Further, as shown in FIG. 2, the distance value U2 can be calculated as a difference between the "value U1" and "the distance value Ua along the optical axis from the object-side lens surface Sa of the first-group first lens L11 to the reflective surface ha of the reflective member H1 plus a distance value Uc along the optical axis from the reflective surface ha to the most image-side lens surface Sc in the third lens group G3 in the state where the zoom setting is set at the wide-angle end".

That is, the value U2 can be transformed as follows:

$$U2 = |(Ua+Uc)-(Ua+Ub)| = |Uc-Ub|.$$

Further, the real-image zoom viewfinder 100 may satisfy conditional expression (2) below:

$$1.5 < |f2/f1| < 2.0,$$

where f1 is a focal length of the first lens group G1, and f2 is a focal length of the second lens group.

If the real-image zoom viewfinder 100 is configured such that the lower limit of the conditional expression (2) is not reached, the power of the second lens group G2 is excessively strong relative to the power of the first lens group G1, resulting in excessively large fluctuation of aberration, such as image plane curve, along with magnification change. On the other hand, if the real-image zoom viewfinder 100 is configured such that the upper limit of the conditional expression (2) is exceeded, the power of the second lens group G2 is excessively weak relative to the power of the first lens group G1, and it is difficult to make the size of the real-image zoom viewfinder 100 compact in the direction orthogonal to the imaging direction and achieve a compact configuration of the camera 200.

Further, the real-image zoom viewfinder 100 may satisfy conditional expression (3) below:

$$1.0 < f3/f2 < 5.0,$$

where f3 is a focal length of the third lens group G3.

If the lower limit of the conditional expression (3) is not reached, the power of the third lens group G3 is excessively strong, resulting in an excessively large amount of change of the optical performance relative to the amount of movement of the third lens group G3 during magnification change, i.e., excessively high sensitivity to change of the optical performance (such as sensitivity to aberration correction). This results in excessively high positioning accuracy required for the third lens group G3 during magnification change, and causes production problems. On the other hand, if the upper limit of the conditional expression (3) is exceeded, the power of the second lens group G2 is excessively strong, resulting in an excessively large amount of change of the optical performance relative to the amount of movement of the second lens group G2 during magnification change, i.e., excessively high sensitivity to change of the optical performance (such as sensitivity to aberration correction). This results in excessively high positioning accuracy required for the second lens group G2 during magnification change, and causes production problems.

The above-described real-image zoom viewfinder 100 can be used to guide an optical image representing a subject 1 located on the object side (see FIG. 1) to the image side (see FIG. 1) to allow visually observing the optical image, for example. According to the real-image zoom viewfinder 100, the thickness reduction in the imaging direction (the direction of arrow Z in the drawing) can be achieved without degrading the optical performance.

Further, a camera 200, which is an imaging apparatus provided with the real-image zoom viewfinder 100, images the subject 1 through an imaging lens 201 of the camera 200. The camera 200 may, for example, be a digital still camera or a still camera for use with a silver halide film.

The thickness reduction of the above-described real-image zoom viewfinder 100 in the imaging direction allows thickness reduction of the camera 200 in the imaging direction. It should be noted that the imaging direction in this case also corresponds to a direction in which light from the subject 1 enters the imaging lens 201.

EXAMPLES

Now, the more specific configuration of Examples 1 to 6 pertaining to the real-image zoom viewfinder of the invention are described with reference to FIGS. 3 and 4.

Figure 3:
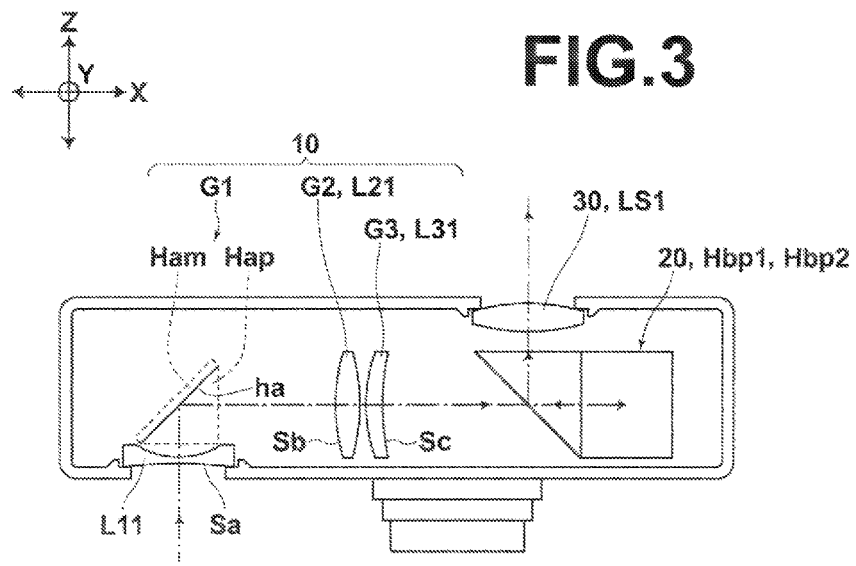
FIG. 3 is a sectional view illustrating the more specific configuration of the real-image zoom viewfinder of the invention and the imaging apparatus provided with the real-image zoom viewfinder.
Figure 4:
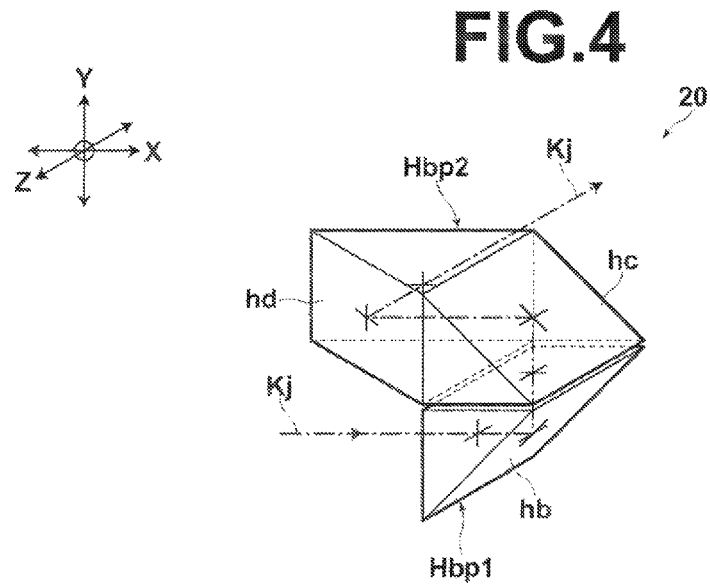
FIG. 4 is an enlarged perspective view of an erect optical system.

FIG. 3 is a sectional view illustrating the more specific configuration of the real-image zoom viewfinder of the invention and the imaging apparatus provided with the real-image zoom viewfinder. FIG. 4 is an enlarged perspective view of the erect optical system. It should be noted that real-image zoom viewfinders of Examples 1 to 6 meet the configuration of the above-described real-image zoom viewfinder 100.

Each of the real-image zoom viewfinders of Examples 1 to 6 includes, in order from the object side, the variable-magnification objective lens system 10 having a positive refractive power, the erect optical system 20, and the eyepiece lens system 30 having a positive refractive power, and is specifically configured as follows.

In each example, the first lens group G1 of the variable-magnification objective lens system 10 includes the first-group first lens L11, which is one lens having a negative refractive power, and a first-group first reflecting mirror Ham or a first-group first prism Hap serving as a reflective member having the reflective surface ha, which are arranged in this order. As the second lens group G2, only a second-group first lens L21, which is one lens having a positive refractive power, is disposed. As the third lens group G3, only a third-group first lens L31, which is one lens having a positive refractive power, is disposed.

The erect optical system 20 of this example is formed by a combination of a first erect optical prism Hbp1 having one reflective surface hb and a second erect optical prism Hbp2 having two reflective surfaces hc and hd.

The eyepiece lens system 30 of this example is formed only by an eyepiece first lens LS1, which is one lens having a positive refractive power.

It should be noted that the first lens group G1 is not limited to one formed by the one first-group first lens L11 and the one reflective member Ha, and may be formed by three or more optical elements.

Also, the second lens group G2, the third lens group G3 and the eyepiece lens system 30 are not limited to those formed by one lens, and may be formed by two or more lenses.

Now, lens data, aberrations, etc., of Examples 1 to 6 of the real-image zoom viewfinder of the invention are described with reference to FIGS. 5A, 5B, 6 to 11, 12 to 17, etc.

Figure 5A:
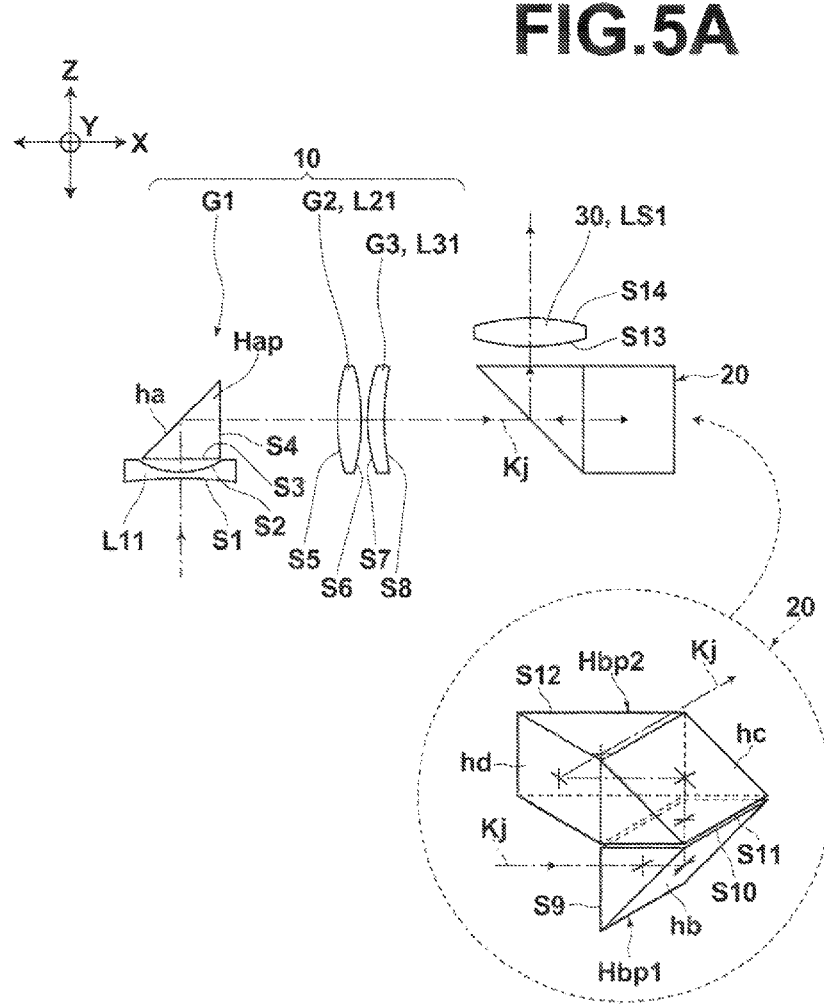
FIG. 5A is a sectional view showing a cross section of the real-image zoom viewfinder which employs a prism as a reflective member.

FIG. 5A is a sectional view showing a cross section of the real-image zoom viewfinder of each of Examples 1 to 5 that employs the first-group first prism Hap as the reflective member, where "S1" to "S14" are surface numbers of the lens surfaces and the reflective surfaces.

Figure 5B:
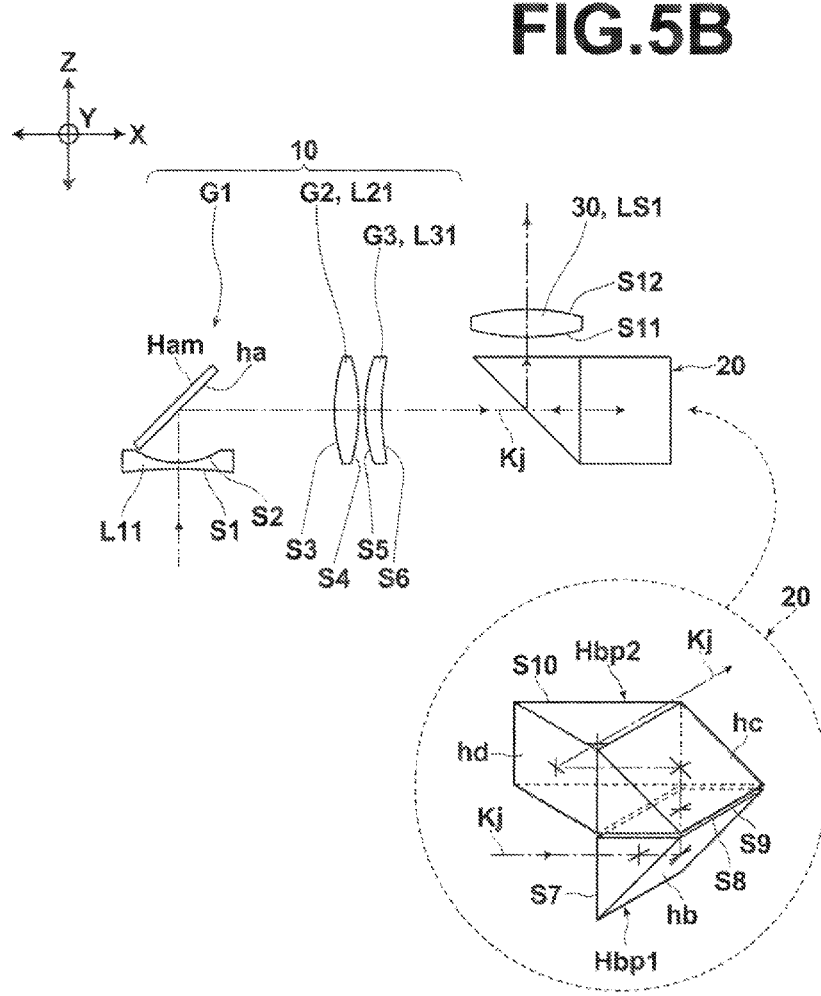
FIG. 5B is a sectional view showing a cross section of the real-image zoom viewfinder which employs a reflecting mirror as the reflective member.

FIG. 5B is a sectional view showing a cross section of the real-image zoom viewfinder of Example 6 that employs the first-group first reflecting mirror Ham as the reflective member, where "S1" to "S12" are surface numbers of the lens surfaces and the reflective surfaces.

Each of FIGS. 6 to 11 is a diagram illustrating a developed view of the configuration and the optical path of the real-image zoom viewfinder of each of Examples 1 to 6. That is, the entire optical axis Kj, which is a bent optical axis, of each real-image zoom viewfinder is developed so that it is shown as a straight line.

It should be noted that a state where the zoom setting is set at the wide-angle end (indicated by the text "WIDE" in the drawing) is shown at the upper portion of each of FIGS. 6 to 11, and a state where the zoom setting is set at telephoto end (indicated by the text "TELE" in the drawing) is shown at the lower portion of each of FIGS. 6 to 11.

Further, each of FIGS. 12 to 17 is a diagram showing aberrations of the real-image zoom viewfinder of each of Examples 1 to 6.

Example 1

Figure 6:
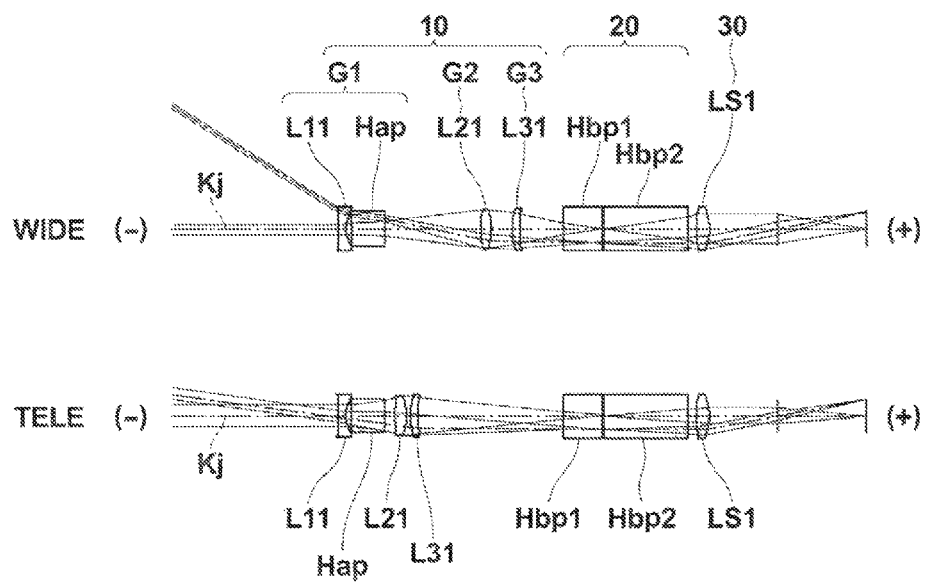
FIG. 6 is a diagram illustrating a developed view of the configuration and the optical path of a real-image zoom viewfinder of Example 1.

FIG. 6 is a diagram illustrating a developed view of the configuration and the optical path of the real-image zoom viewfinder of Example 1.

Table 1A, which will be described later, shows data about the real-image zoom viewfinder of Example 1. Lens data is shown in the upper table of Table 1A, and data relating to zoom of the real-image zoom viewfinder is shown in the lower table of Table 1A.

In the lens data shown in the upper table of Table 1A, each value in the column of "Surface number Si" represents the surface number of the i-th (i=1, 2, 3, . . . ) lens surface, or the like, where the number is sequentially increased from the most object-side surface toward the image side.

Each value in the column of "Radius of curvature Ri" represents the radius of curvature of the i-th (i=1, 2, 3, ...) surface. Each value in the column of "Surface interval Di" (i=1, 2, 3, ...) represents the surface interval between the i-th surface and the i+1-th surface along the optical axis Kj. The symbols "Ri" and "Di" in the lens data correspond to the symbol "Si" (i=1, 2, 3, ...) representing each lens surface, or the like.

It should be noted that, in each cell in the column of "Surface interval Di" (i=1, 2, 3, ...), a numerical value representing a surface interval or a symbol "Dm" (m is an integer) is shown. Each symbol Dm corresponds to a surface interval (air space) between the lens groups which is changed when the zoom ratio is changed.

Each value in the column of "Nj" represents the refractive index with respect to the wavelength of 587.6 nm (the d-line) of the j-th (j=1, 2, 3, ...) optical element, where the number is sequentially increased from the object side toward the image side. Each value in the column of "vj" represents the Abbe number with respect to the d-line of the j-th optical element.

With respect to the lens data shown in Table 1A, the unit of the radius of curvature and the surface interval is "millimeter". A positive value of the radius of curvature indicates that the surface is convex toward the object side, and a negative value of the radius of curvature indicates that the surface is convex toward the image side.

It should be noted that, in general, optical systems like the one described above can maintain given performance even when dimensions of optical elements, such as lenses, are proportionally enlarged or reduced. Therefore, zoom lenses having a configuration where the entire lens data described above are proportionally enlarged or reduced can also be regarded as examples of the invention.

The data relating to zoom shown in the lower table of Table 1A shows values of intervals D4, D6 and D8 between the lens groups, a viewfinder magnification ratio m, and an angle of field (total angle of field) 2ω at the wide-angle end (WIDE) and at the telephoto end (TELE).

TABLE 1A

Example 1

| Surface number Si | Radius of curvature Ri | Surface interval Di | Refractive index Nj | Abbe number vj |
|---|---|---|---|---|
| *1 | 15.0931 | 1.800 | 1.583641 | 30.27 |
| *2 | 4.1787 | 1.400 | | |
| 3 | ∞ | 7.628 | 1.846660 | 23.78 |
| 4 | ∞ | D4 | | |
| 5 | 28.1657 | 2.500 | 1.490233 | 57.45 |
| *6 | −12.9385 | D6 | | |
| 7 | 14.3879 | 1.750 | 1.487490 | 70.23 |
| 8 | 38.3842 | D8 | | |
| 9 | ∞ | 9.000 | 1.490233 | 57.45 |
| 10 | ∞ | 0.500 | | |
| 11 | ∞ | 19.125 | 1.490233 | 57.45 |
| 12 | ∞ | 2.009 | | |
| 13 | 23.3798 | 3.000 | 1.490233 | 57.45 |
| *14 | −11.8663 | | | |

Data relating to zoom

| Specifications | Wide-angle end | Telephoto end |
|---|---|---|
| Finder magnification: m | 0.35 | 1.38 |
| Angle of field: 2ω | 64.4 | 15.9 |

TABLE 1A-continued

Example 1

| | | |
|---|---|---|
| Interval: D4 | 22.072 | 2.465 |
| Interval: D6 | 4.713 | 0.909 |
| Interval: D8 | 10.044 | 33.456 |

*aspherical surface

Table 1B shows aspherical coefficients representing the shape of each aspherical surface of the real-image zoom viewfinder of Example 1. It should be noted that, in the lens data shown in Table 1A, each aspherical surfaces is indicated by the symbol "*" added to the surface number thereof, and aspherical coefficients representing the shapes of the aspherical surfaces corresponding to those surface numbers are shown in Table 1B.

The sign, positive or negative, of the refractive power of each aspherical lens is defined by whether the refractive power of the aspherical lens in the paraxial region is positive or negative.

The aspherical coefficients shown in Table 1B are generated such that an aspherical surface shape is defined when they are applied to the aspherical surface equation below:

$$Z = C \cdot h^2 / \{1 + (1 - K \cdot C^2 \cdot h^2)^{1/2}\} + \Sigma An \cdot h^n,$$

where Z is a depth (mm) of the aspherical surface, h is a distance (height) (mm) from the optical axis to the lens surface, K is an aspherical coefficient representing a quadric surface, C is a paraxial curvature=1/R (1/mm) (R: a paraxial radius of curvature (mm)), and An is an aspherical coefficient of the n-th order (n is an integer of 3 or more).

TABLE 1B

Aspherical coefficients

| S1 | |
|---|---|
| K | 1.3907348E+00 |
| A4 | −4.0325010E−03 |
| A6 | 2.0197089E−04 |
| A8 | −5.3771983E−06 |
| A10 | 5.8401279E−08 |
| S2 | |
| K | −4.3440692E+00 |
| A4 | 1.0728160E−03 |
| A6 | −1.8344934E−04 |
| A8 | 1.5258941E−05 |
| A10 | −3.9169569E−07 |
| S6 | |
| K | −1.4128336E+01 |
| A4 | −7.6175238E−04 |
| A6 | 2.9795942E−05 |
| A8 | −9.4196941E−07 |
| A10 | 1.3872724E−08 |
| S14 | |
| K | 4.7993994E+00 |
| A4 | 3.6196499E−04 |
| A6 | 2.4508502E−05 |
| A8 | −1.2672789E−06 |
| A10 | 4.0638735E−08 |

Figure 12:
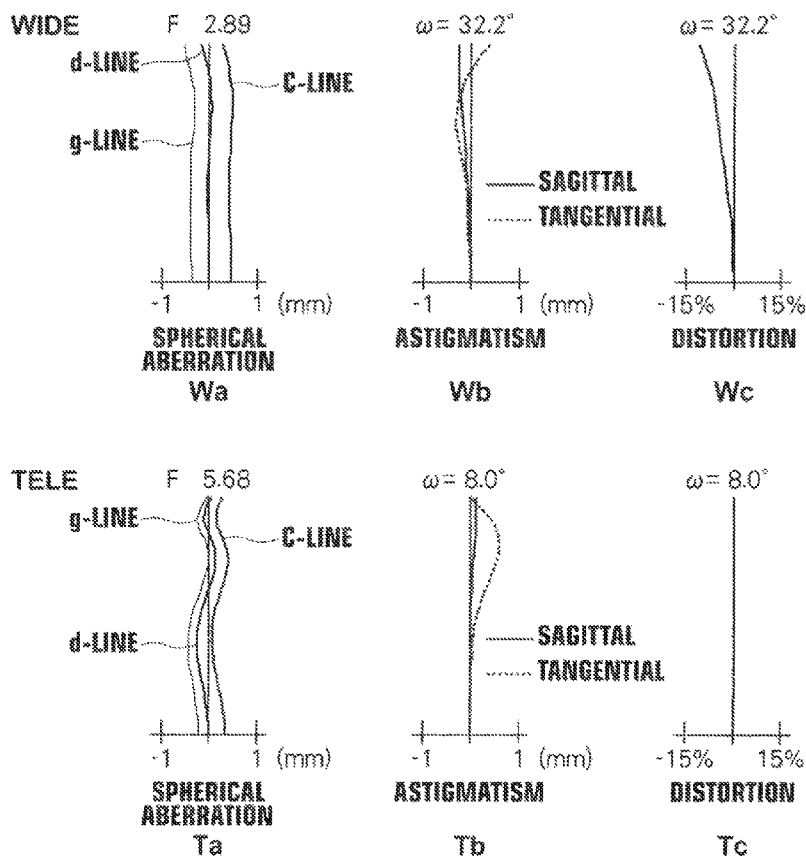
FIG. 12 is a diagram showing aberrations of the real-image zoom viewfinder of Example 1.

FIG. 12 is a diagram showing spherical aberration, astigmatism and distortion of the real-image zoom viewfinder of Example 1 at the wide-angle end (WIDE) and at the telephoto end (TELE), respectively, where the aberrations shown are with respect to light of the d-line, the g-line and the c-line, respectively. Each astigmatism diagram shows aberrations with respect to a sagittal image plane and a tangential image plane.

As shown in FIG. 12, the diagrams indicated by symbols "Wa" and "Ta" show spherical aberration, the diagrams indicated by symbols "Wb" and "Tb" show astigmatism, and the diagrams indicated by symbols "Wc" and "Tc" show distortion.

Further, Table 7 shown at the end of the description of examples show calculated values of the conditional expressions (1), (2) and (3) of each of Examples 1 to 6. The values in each conditional expression can be found from the data shown in Tables 1A, 1B, . . . , 6A and 6B.

The real-image zoom viewfinder of Example 1 is an afocal system viewfinder. As shown in Table 1A, the viewfinder magnification ratio m and the angle of field 2ω at the wide-angle end are 0.35× and 64.4°, respectively, and the viewfinder magnification ratio m and the angle of field 2ω at the telephoto end are 1.38× and 15.9°, respectively.

As can be seen from the above-described data, etc., the real-image zoom viewfinder of Example 1 can achieve the thickness reduction in the imaging direction without degrading the optical performance.

It should be noted that the above explanations about how to read FIG. 6 illustrating the configuration of the real-image zoom viewfinder of Example 1, FIG. 12 showing the aberrations of this real-image zoom viewfinder, Tables 1A and 1B showing the lens data, etc., of this real-image zoom viewfinder, and Table 7 showing the values of the conditional expressions (1), (2) and (3) also apply to the drawings and tables with respect to Examples 2 to 6 described below, and the same explanations are not repeated in the description of the following examples.

It should be noted that Example 6 differs from Examples 1 to 5 in that surface numbers of Example 6 are up to 12 as shown in Table 6A, intervals between the lens groups of Example 6 are positions indicated by "D2", "D4" and "D6", and the reflective member of Example 6 is formed by a reflecting mirror.

Example 2

FIG. 7 is a diagram illustrating a developed view of the configuration and the optical path of the real-image zoom viewfinder of Example 2.

Table 2A shows data about the real-image zoom viewfinder of Example 2. Lens data is shown in the upper table of Table 2A, and data relating to zoom of the real-image zoom viewfinder is shown in the lower table of Table 2A.

TABLE 2A

Example 2

| Surface number Si | Radius of curvature Ri | Surface interval Di | Refractive index Nj | Abbe number υj |
|---|---|---|---|---|
| *1 | 18.7422 | 1.800 | 1.583641 | 30.27 |
| *2 | 5.2965 | 1.400 | | |
| 3 | ∞ | 7.628 | 1.846660 | 23.78 |
| 4 | ∞ | D4 | | |
| 5 | 32.136 | 2.500 | 1.490233 | 57.45 |
| *6 | −13.8448 | D6 | | |
| 7 | 21.3476 | 1.750 | 1.487490 | 70.23 |
| 8 | 65.0217 | D8 | | |
| 9 | ∞ | 9.000 | 1.490233 | 57.45 |
| 10 | ∞ | 0.500 | | |
| 11 | ∞ | 19.125 | 1.490233 | 57.45 |
| 12 | ∞ | 3.379 | | |
| 13 | 45.673 | 4.500 | 1.490233 | 57.45 |
| *14 | −10.3661 | | | |

TABLE 2A-continued

Example 2

Data relating to zoom

| Specifications | Wide-angle end | Telephoto end |
|---|---|---|
| Finder magnification: m | 0.43 | 1.72 |
| Angle of field: 2ω | 58.3 | 13.3 |
| Interval: D4 | 25.648 | 2.458 |
| Interval: D6 | 11.052 | 2.140 |
| Interval: D8 | 9.954 | 42.056 |

*aspherical surface

Table 2B shows aspherical coefficients representing the shape of each aspherical surface of the real-image zoom viewfinder of Example 2.

TABLE 2B

Aspherical coefficients

| S1 | |
|---|---|
| K | 1.4525891E+00 |
| A4 | −4.0371102E−03 |
| A6 | 1.9977745E−04 |
| A8 | −5.3873564E−06 |
| A10 | 5.4786826E−08 |
| S2 | |
| K | −7.5237490E+00 |
| A4 | 6.4923052E−04 |
| A6 | −1.7897030E−04 |
| A8 | 1.5309439E−05 |
| A10 | −4.1997345E−07 |
| S6 | |
| K | −1.7304204E+01 |
| A4 | −7.6213802E−04 |
| A6 | 3.0062815E−05 |
| A8 | −9.0948595E−07 |
| A10 | 1.2929386E−08 |
| S14 | |
| K | 3.5483553E+00 |
| A4 | 2.9693654E−04 |
| A6 | 2.6241764E−05 |
| A8 | −1.2547657E−06 |
| A10 | 4.0040595E−08 |

Figure 13:
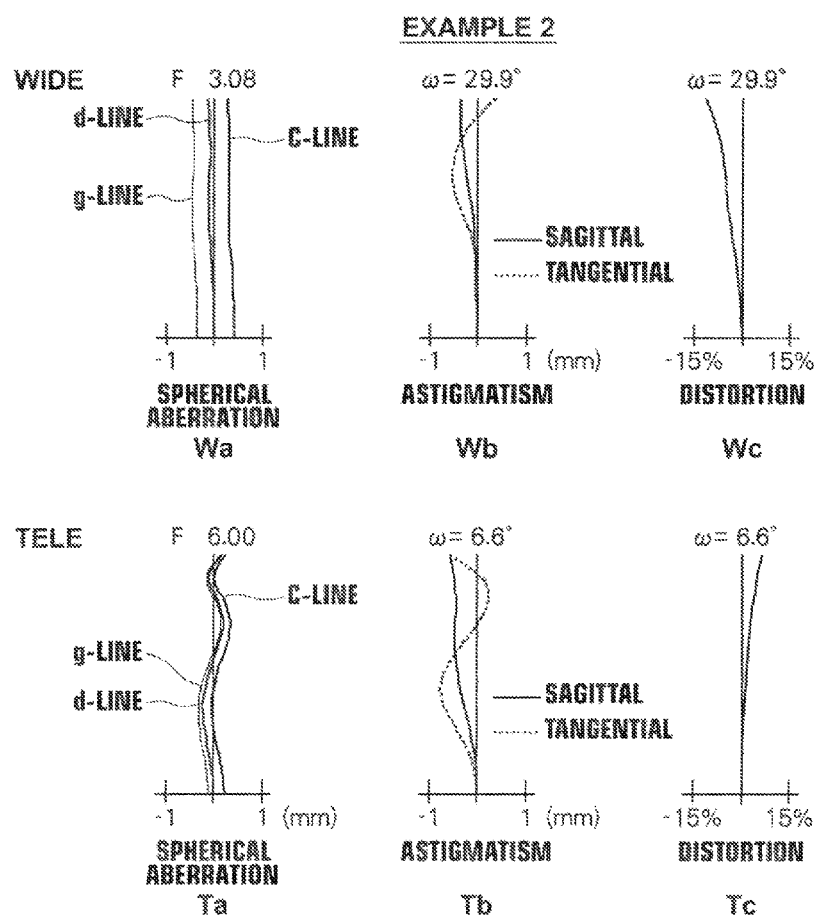
FIG. 13 is a diagram showing aberrations of the real-image zoom viewfinder of Example 2.

FIG. 13 is a diagram showing spherical aberration, astigmatism and distortion of the real-image zoom viewfinder of Example 2 at the wide-angle end (WIDE) and at the telephoto end (TELE), respectively.

The real-image zoom viewfinder of Example 2 is an afocal system viewfinder. As shown in Table 2A, the viewfinder magnification ratio m and the angle of field 2ω at the wide-angle end are 0.43× and 58.3°, respectively, and the viewfinder magnification ratio m and the angle of field 2ω at the telephoto end are 1.72× and 13.3°, respectively.

As can be seen from the above-described data, etc., the real-image zoom viewfinder of Example 2 can also achieve the thickness reduction in the imaging direction without degrading the optical performance.

Example 3

FIG. 8 is a diagram illustrating a developed view of the configuration and the optical path of the real-image zoom viewfinder of Example 3.

Table 3A shows data about the real-image zoom viewfinder of Example 3. Lens data is shown in the upper table of Table 3A, and data relating to zoom of the real-image zoom viewfinder is shown in the lower table of Table 3A.

TABLE 3A

Example 3

| Surface number Si | Radius of curvature Ri | Surface interval Di | Refractive index Nj | Abbe number υj |
|---|---|---|---|---|
| *1 | 14.792 | 1.800 | 1.583641 | 30.27 |
| *2 | 4.1567 | 1.400 | | |
| 3 | ∞ | 7.628 | 1.846660 | 23.78 |
| 4 | ∞ | D4 | | |
| 5 | 19.4374 | 2.500 | 1.490233 | 57.45 |
| *6 | −12.4582 | D6 | | |
| 7 | 14.2734 | 1.750 | 1.487490 | 70.23 |
| 8 | 33.1381 | D8 | | |
| 9 | ∞ | 9.000 | 1.490233 | 57.45 |
| 10 | ∞ | 0.500 | | |
| 11 | ∞ | 19.125 | 1.490233 | 57.45 |
| 12 | ∞ | 2.000 | | |
| 13 | 23.0091 | 3.000 | 1.490233 | 57.45 |
| *14 | −12.9246 | | | |

Data relating to zoom

| Specifications | Wide-angle end | Telephoto end |
|---|---|---|
| Finder magnification: m | 0.30 | 1.21 |
| Angle of field: 2ω | 69.6 | 17.2 |
| Interval: D4 | 19.68 7 | 1.454 |
| Interval: D6 | 0.500 | 0.667 |
| Interval: D8 | 9.720 | 27.786 |

*aspherical surface

Table 3B shows aspherical coefficients representing the shape of each aspherical surface of the real-image zoom viewfinder of Example 3.

TABLE 3B

Aspherical coefficients

| | S1 |
|---|---|
| K | 2.8595296E+00 |
| A4 | −4.0491039E−03 |
| A6 | 2.0081894E−04 |
| A8 | −5.2882852E−06 |
| A10 | 5.5570715E−08 |
| | S2 |
| K | −4.5177320E+00 |
| A4 | 1.0864119E−03 |
| A6 | −1.7691967E−04 |
| A8 | 1.5223003E−05 |
| A10 | −3.9533365E−07 |
| | S6 |
| K | −1.3797472E+01 |
| A4 | −7.4072091E−04 |
| A6 | 3.0253532E−05 |
| A8 | −9.0404691E−07 |
| A10 | 1.2266977E−08 |
| | S14 |
| K | 5.7981733E+00 |
| A4 | 2.4495478E−04 |
| A6 | 2.7098864E−05 |
| A8 | −1.2564037E−06 |
| A10 | 3.9652919E−08 |

Figure 14:
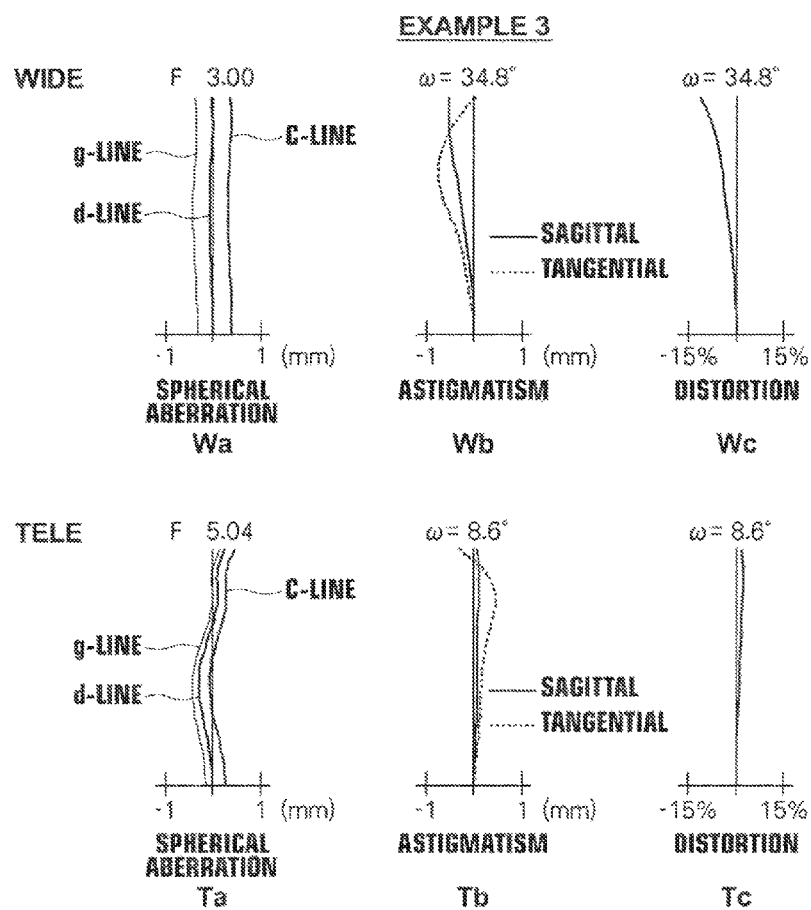
FIG. 14 is a diagram showing aberrations of the real-image zoom viewfinder of Example 3.

FIG. 14 is a diagram showing spherical aberration, astigmatism and distortion of the real-image zoom viewfinder of Example 3 at the wide-angle end (WIDE) and at the telephoto end (TELE), respectively.

The real-image zoom viewfinder of Example 3 is an afocal system viewfinder. As shown in Table 3A, the viewfinder magnification ratio m and the angle of field 2ω at the wide-angle end are 0.30× and 69.6°, respectively, and the viewfinder magnification ratio m and the angle of field 2ω at the telephoto end are 1.21× and 17.2°, respectively.

As can be seen from the above-described data, etc., the real-image zoom viewfinder of Example 3 can also achieve the thickness reduction in the imaging direction without degrading the optical performance.

Example 4

FIG. 9 is a diagram illustrating a developed view of the configuration and the optical path of the real-image zoom viewfinder of Example 4.

Table 4A shows data about the real-image zoom viewfinder of Example 4. Lens data is shown in the upper table of Table 4A, and data relating to zoom of the real-image zoom viewfinder is shown in the lower table of Table 4A.

TABLE 4A

Example 4

| Surface number Si | Radius of curvature Ri | Surface interval Di | Refractive index Nj | Abbe number υj |
|---|---|---|---|---|
| *1 | 5.6004 | 1.800 | 1.583641 | 30.27 |
| *2 | 2.936 | 1.400 | | |
| 3 | ∞ | 7.628 | 1.846660 | 23.78 |
| 4 | ∞ | D4 | | |
| 5 | 36.5325 | 2.500 | 1.490233 | 57.45 |
| *6 | −10.6566 | D6 | | |
| 7 | 8.5401 | 1.750 | 1.487490 | 70.23 |
| 8 | 10.4765 | D8 | | |
| 9 | ∞ | 9.000 | 1.490233 | 57.45 |
| 10 | ∞ | 0.500 | | |
| 11 | ∞ | 19.125 | 1.490233 | 57.45 |
| 12 | ∞ | 3.058 | | |
| 13 | 21.5048 | 4.500 | 1.490233 | 57.45 |
| *14 | −12.7128 | | | |

Data relating to zoom

| Specifications | Wide-angle end | Telephoto end |
|---|---|---|
| Finder magnification: m | 0.41 | 1.64 |
| Angle of field: 2ω | 58.5 | 14.1 |
| Interval: D4 | 21.605 | 1.448 |
| Interval: D6 | 0.500 | 0.618 |
| Interval: D8 | 10.756 | 30.796 |

*aspherical surface

Table 4B shows aspherical coefficients representing the shape of each aspherical surface of the real-image zoom viewfinder of Example 4.

TABLE 4B

Aspherical coefficients

| | S1 |
|---|---|
| K | −2.8528077E−01 |
| A4 | −4.3910996E−03 |
| A6 | 1.9367290E−04 |
| A8 | −5.0063798E−06 |
| A10 | 4.9925006E−08 |
| | S2 |
| K | −1.9136557E+00 |
| A4 | 9.9557496E−04 |
| A6 | −1.7734185E−04 |
| A8 | 1.4509837E−05 |
| A10 | −4.1211710E−07 |
| | S6 |
| K | −8.5113136E+00 |
| A4 | −8.4861843E−04 |

TABLE 4B-continued

| Aspherical coefficients | |
|---|---|
| A6 | 2.8894400E−05 |
| A8 | −7.1399978E−07 |
| A10 | 7.0968622E−09 |
| S14 | |
| K | 5.6027280E+00 |
| A4 | 3.2454004E−04 |
| A6 | 2.5811557E−05 |
| A8 | −1.2525782E−06 |
| A10 | 3.8953949E−08 |

Figure 15:
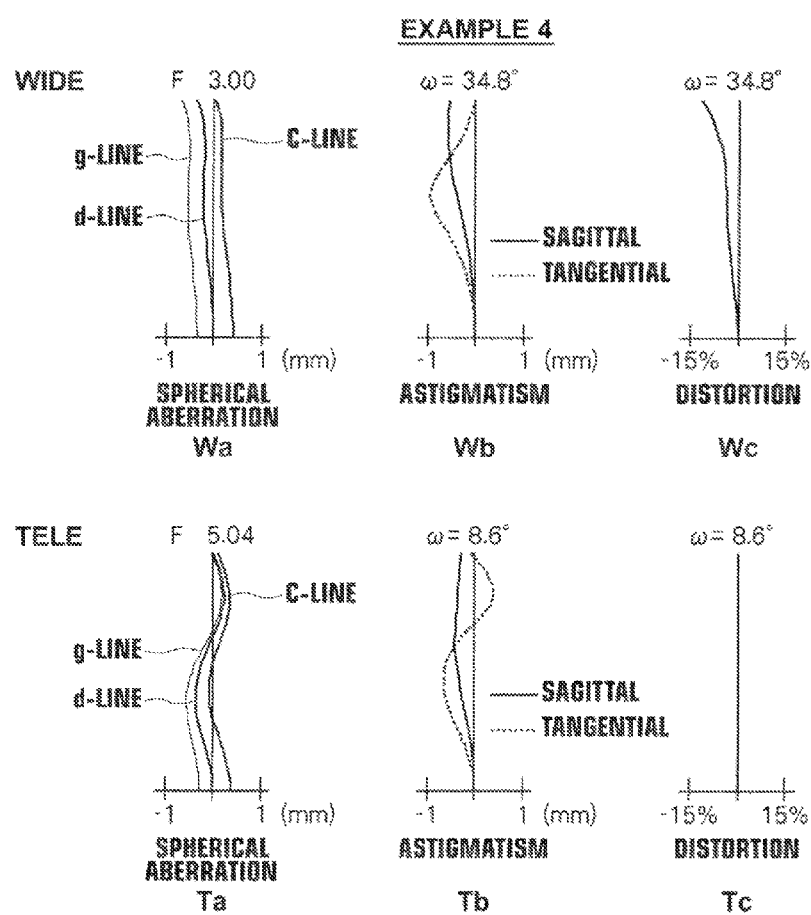
FIG. 15 is a diagram showing aberrations of the real-image zoom viewfinder of Example 4.

FIG. 15 is a diagram showing spherical aberration, astigmatism and distortion of the real-image zoom viewfinder of Example 4 at the wide-angle end (WIDE) and at the telephoto end (TELE), respectively.

The real-image zoom viewfinder of Example 4 is an afocal system viewfinder. As shown in Table 4A, the viewfinder magnification ratio m and the angle of field 2ω at the wide-angle end are 0.41× and 58.5°, respectively, and the viewfinder magnification ratio m and the angle of field 2ω at the telephoto end are 1.64× and 14.1°, respectively.

As can be seen from the above-described data, etc., the real-image zoom viewfinder of Example 4 can also achieve the thickness reduction in the imaging direction without degrading the optical performance.

Example 5

FIG. 10 is a diagram illustrating a developed view of the configuration and the optical path of the real-image zoom viewfinder of Example 5.

Table 5A shows data about the real-image zoom viewfinder of Example 5. Lens data is shown in the upper table of Table 5A, and data relating to zoom of the real-image zoom viewfinder is shown in the lower table of Table 5A.

TABLE 5A

Example 5

| Surface number Si | Radius of curvature Ri | Surface interval Di | Refractive index Nj | Abbe number υj |
|---|---|---|---|---|
| *1 | 31.6614 | 1.800 | 1.583641 | 30.2 |
| *2 | 4.0149 | 1.400 | | |
| 3 | ∞ | 7.628 | 1.846660 | 23.7 |
| 4 | ∞ | D4 | | |
| 5 | −124.8886 | 2.500 | 1.490233 | 57.4 |
| *6 | −9.1817 | D6 | | |
| 7 | 10.9708 | 1.750 | 1.487490 | 70.2 |
| 8 | 65.031 | D8 | | |
| 9 | ∞ | 9.000 | 1.490233 | 57.4 |
| 10 | ∞ | 0.500 | | |
| 11 | ∞ | 19.125 | 1.490233 | 57.4 |
| 12 | ∞ | 2.000 | | |
| 13 | 16.6454 | 3.000 | 1.490233 | 57.4 |
| *14 | −16.1093 | | | |

Data relating to zoom

| Specifications | Wide-angle end | Telephoto end |
|---|---|---|
| Finder magnification: m | 0.23 | 0.93 |
| Angle of field: 2ω | 75.2 | 22.2 |
| Interval: D4 | 19.318 | 1.975 |
| Interval: D6 | 0.608 | 0.678 |
| Interval: D8 | 9.328 | 26.601 |

*aspherical surface

Table 5B shows aspherical coefficients representing the shape of each aspherical surface of the real-image zoom viewfinder of Example 5.

TABLE 5B

| Aspherical coefficients | |
|---|---|
| S1 | |
| K | 5.4666645E+00 |
| A4 | −2.8985384E−03 |
| A6 | 1.9102447E−04 |
| A8 | −4.9108365E−06 |
| A10 | 4.5133632E−08 |
| S2 | |
| K | −4.5509086E+00 |
| A4 | 2.0014462E−03 |
| A6 | −1.0833198E−04 |
| A8 | 1.4522830E−05 |
| A10 | −4.5660944E−07 |
| S6 | |
| K | −7.8401972E+00 |
| A4 | −1.1610273E−03 |
| A6 | 3.3380382E−05 |
| A8 | −6.9606978E−07 |
| A10 | 4.5559952E−09 |
| S14 | |
| K | 9.8041449E+00 |
| A4 | 2.1676614E−04 |
| A6 | 3.1637813E−05 |
| A8 | −1.5495305E−06 |
| A10 | 4.8738209E−08 |

Figure 16:
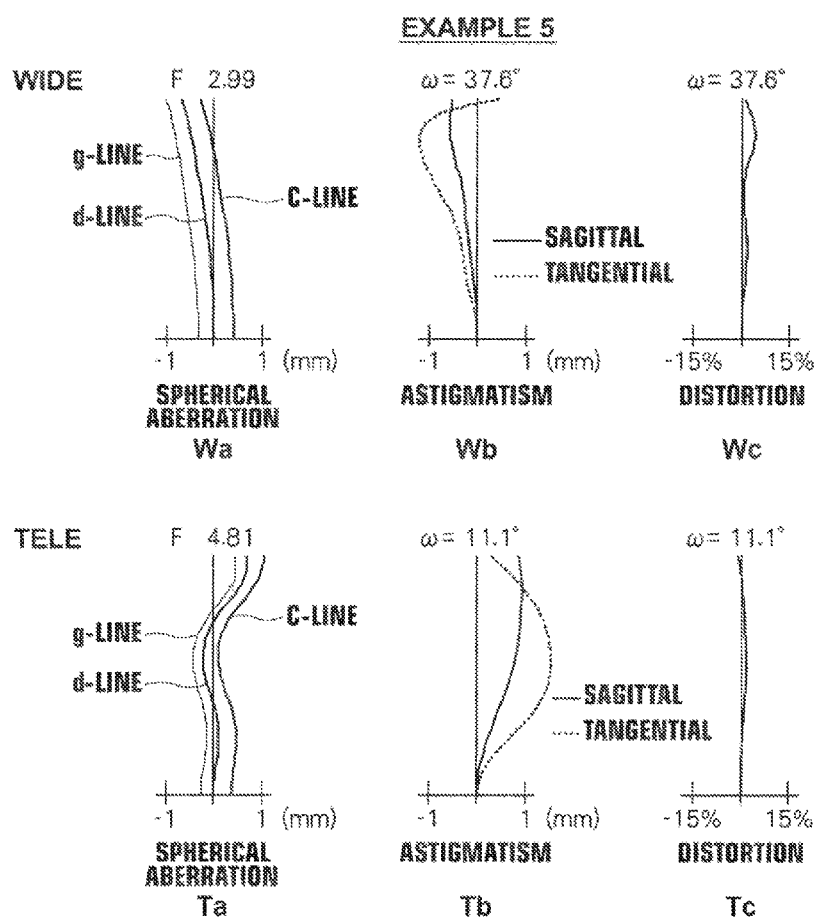
FIG. 16 is a diagram showing aberrations of the real-image zoom viewfinder of Example 5.

FIG. 16 is a diagram showing spherical aberration, astigmatism and distortion of the real-image zoom viewfinder of Example 5 at the wide-angle end (WIDE) and at the telephoto end (TELE), respectively.

The real-image zoom viewfinder of Example 5 is an afocal system viewfinder. As shown in Table 5A, the viewfinder magnification ratio m and the angle of field 2ω at the wide-angle end are 0.23× and 75.2°, respectively, and the viewfinder magnification ratio m and the angle of field 2ω at the telephoto end are 0.93× and 22.2°, respectively.

As can be seen from the above-described data, etc., the real-image zoom viewfinder of Example 5 can also achieve the thickness reduction in the imaging direction without degrading the optical performance.

Example 6

FIG. 11 is a diagram illustrating a developed view of the configuration and the optical path of the real-image zoom viewfinder of Example 6.

Table 6A shows data about the real-image zoom viewfinder of Example 6. Lens data is shown in the upper table of Table 6A, and data relating to zoom of the real-image zoom viewfinder is shown in the lower table of Table 6A.

TABLE 6A

Example 6

| Surface number Si | Radius of curvature Ri | Surface interval Di | Refractive index Nj | Abbe number υj |
|---|---|---|---|---|
| *1 | 14.9432 | 1.800 | 1.688930 | 31.1 |
| *2 | 4.4135 | D2 | | |
| 3 | 26.9089 | 2.500 | 1.490233 | 57.45 |
| *4 | −13.8516 | D4 | | |
| 5 | 20.3699 | 1.750 | 1.487490 | 70.23 |
| 6 | 65.0003 | D6 | | |
| 7 | ∞ | 9.000 | 1.490233 | 57.45 |
| 8 | ∞ | 0.500 | | |
| 9 | ∞ | 19.125 | 1.490233 | 57.45 |
| 10 | ∞ | 2.000 | | |

TABLE 6A-continued

Example 6

| | | | | |
|---|---|---|---|---|
| 11 | 25.0962 | 3.000 | 1.490233 | 57.45 |
| *12 | −11.3311 | | | |

Data relating to zoom

| Specifications | Wide-angle end | Telephoto end |
|---|---|---|
| Finder magnification: m | 0.34 | 1.36 |
| Angle of field: 2ω | 65.6 | 16.0 |
| Interval: D2 | 31.759 | 10.373 |
| Interval: D4 | 8.232 | 0.566 |
| Interval: D6 | 10.005 | 39.057 |

*aspherical surface

Table 6B shows aspherical coefficients representing the shape of each aspherical surface of the real-image zoom viewfinder of Example 6.

TABLE 6B

Aspherical coefficients

| S1 | |
|---|---|
| K | −2.3577620E−01 |
| A4 | −3.9495989E−03 |
| A6 | 2.0335499E−04 |
| A8 | −5.3831720E−06 |
| A10 | 5.7096493E−08 |

| S2 | |
|---|---|
| K | −5.4983661E+00 |
| A4 | 1.2207869E−03 |
| A6 | −1.8676617E−04 |
| A8 | 1.5336091E−05 |
| A10 | −3.9466550E−07 |

| S4 | |
|---|---|
| K | −1.7899635E+01 |
| A4 | −7.5278776E−04 |
| A6 | 2.9924229E−05 |
| A8 | −9.3524906E−07 |
| A10 | 1.3656249E−08 |

| S12 | |
|---|---|
| K | 4.3338153E+00 |
| A4 | 3.3125529E−04 |
| A6 | 2.5136223E−05 |
| A8 | −1.2702439E−06 |
| A10 | 4.1199501E−08 |

FIG. 17 is a diagram showing spherical aberration, astigmatism and distortion of the real-image zoom viewfinder of Example 6 at the wide-angle end (WIDE) and at the telephoto end (TELE), respectively.

The real-image zoom viewfinder of Example 6 is an afocal system viewfinder. As shown in Table 6A, the viewfinder magnification ratio m and the angle of field 2ω at the wide-angle end are 0.34× and 65.6°, respectively, and the viewfinder magnification ratio m and the angle of field 2 ω at the telephoto end are 1.36× and 16.0°, respectively.

As can be seen from the above-described data, etc., the real-image zoom viewfinder of Example 6 can also achieve the thickness reduction in the imaging direction without degrading the optical performance.

TABLE 7

Values of individual conditional expressions of each example

| | (1) | (2) | (3) |
|---|---|---|---|
| Example 1 | 2.14 | 1.76 | 2.50 |
| Example 2 | 2.95 | 1.52 | 3.20 |
| Example 3 | 1.91 | 1.51 | 3.14 |
| Example 4 | 2.17 | 1.22 | 4.27 |
| Example 5 | 2.73 | 2.50 | 1.34 |
| Example 6 | 1.95 | 2.81 | 3.16 |

It should be noted that the present invention is not limited to the above-described examples, and various modifications may be made to the invention without changing the gist of the invention. For example, the values of the radius of curvature, the surface interval, the refractive index, etc., of each lens are not limited to the numerical values shown in the above tables and may take different values.

What is claimed is:

1. A real-image zoom viewfinder substantially consisting of, in order from an object side, a variable-magnification objective lens system having a positive refractive power, an erect optical system, and an eyepiece lens system having a positive refractive power, wherein
the variable-magnification objective lens system substantially consisting of, in order from the object side, a first lens group that includes a first lens having a negative refractive power and a reflective member arranged in this order from the object side and is fixed during magnification change, a second lens group that has a positive refractive power and is moved during magnification change, and a third lens group that has a positive refractive power and is moved during magnification change,
the erect optical system has at least one reflective surface for converting an inverted image formed by the variable-magnification objective lens system into an erect image and is fixed during magnification change,
the eyepiece lens system has a positive refractive power and is fixed during magnification change, and
conditional expressions (1), (2A) and (3) below are satisfied at the same time:

$$1.5 < U2/U1 < 3.0 \quad (1),$$

$$1.76 \leq |f2/f1| < 2.0 \quad (2A) \text{ and}$$

$$1.0 < f3/f2 < 5.0 \quad (3),$$

where U1 is a distance from an object-side lens surface of the first lens to a most object-side lens surface in the second lens group along an optical axis in a state where zoom setting is set at a telephoto end, U2 is a difference between the distance from the object-side lens surface of the first lens to the most object-side lens surface in the second lens group along the optical axis in a state where the zoom setting is set at the telephoto end and a distance from the object-side lens surface of the first lens to a most image-side lens surface in the third lens group along the optical axis in a state where the zoom setting is set at a wide-angle end, f1 is a focal length of the first lens group, f2 is a focal length of the second lens group, and f3 is a focal length of the third lens group.

2. The real-image zoom viewfinder as claimed in claim 1, wherein
the reflective member in the first lens group bends an optical path of light entering through the first lens into a direction orthogonal to an optical axis of the first lens, the second lens group and the third lens group are disposed in the optical path of the light that is bent and propagates in the direction orthogonal to the optical axis, and the erect optical system bends the optical path of the light that propagates in the direction orthogonal to the optical axis through the variable-magnification objective lens system into the optical axis direction of the first lens.

3. An imaging apparatus comprising the real-image viewfinder as claimed in claim 1.

4. An imaging apparatus comprising the real-image viewfinder as claimed in claim 2.

* * * * *